(No Model.)
J. L. COLLINS.
EDUCATIONAL APPLIANCE.
No. 487,695. Patented Dec. 6, 1892.
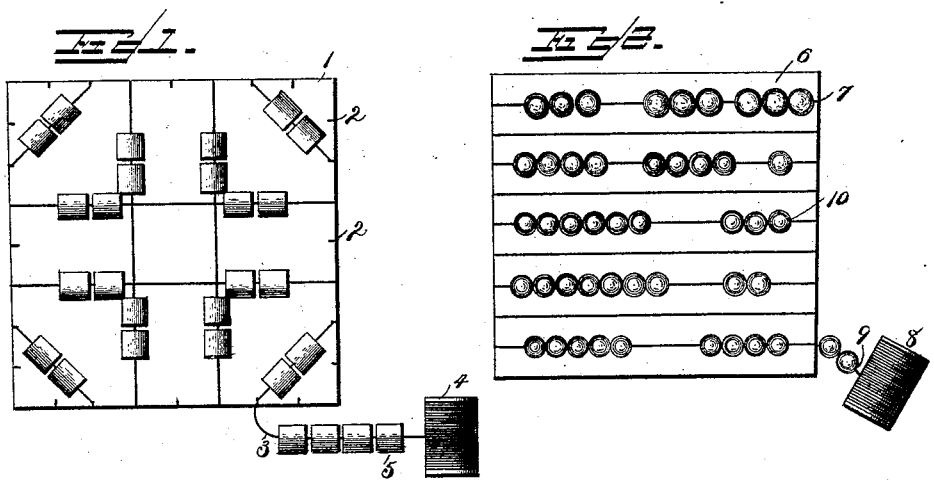
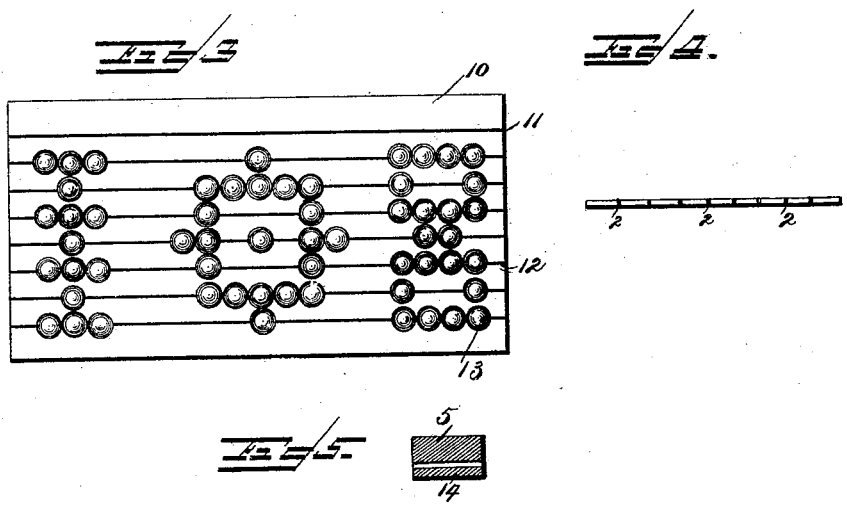
Witnesses
W. O. Schneider
John H. Diggers
Inventor
J. L. Collins.
By his Attorneys,
C. A. Snow & Co.

UNITED STATES PATENT OFFICE.

JUDITH L. COLLINS, OF MONONGAHELA CITY, PENNSYLVANIA.

EDUCATIONAL APPLIANCE.

SPECIFICATION forming part of Letters Patent No. 487,695, dated December 6, 1892.

Application filed August 24, 1892. Serial No. 444,026. (No model.)

*To all whom it may concern:*

Be it known that I, JUDITH L. COLLINS, a citizen of the United States, residing at Monongahela City, in the county of Washington and State of Pennsylvania, have invented certain new and useful Improvements in Educational Appliances, of which the following is a specification.

This invention relates to educational appliances, and particularly to that class thereof adapted for use in primary or kindergarten schools, and in which are employed a series of buttons conveniently strung and adapted for teaching the lower branches of arithmetic, such as counting, subtracting, and adding, and, furthermore, to be used in giving object-lessons, in forming designs, &c.

The objects of the invention are to provide an apparatus for accomplishing the above by the use of beads or buttons, to avoid the annoyance to the teachers and the distraction of the attention of the pupils by the constant dropping of buttons and rolling of the same upon the floor, to adapt the apparatus for teaching symmetrical and other designs, and to aid beginners in "number-work," and to so combine the strings, board, and buttons as to adapt them to form different parts of the design.

Referring to the drawings, Figures 1, 2, and 3 are elevations of apparatuses embodying my invention, the same being shown in different forms. Fig. 4 is an edge view of one of the boards. Fig. 5 is a transverse section of one of the buttons.

Like numerals of reference indicate like parts in all the figures of the drawings.

In Fig. 1, 1 designates a board, which may be formed of any suitable material, such as wood, card-board, metal, &c., and the same is in this instance exactly square. The four edges of the board are each provided with a series of notches or kerfs 2, the same being arranged in odd numbers, in this instance seven to the edge, so that the central notch or kerf will be directly opposite the centers of the edges. The board may be of any color desired, or black and white, and it is preferred that the string 3 will be of some color at variance with the board—as, for instance, if the board is white, the string is preferably black, and vice versa. The string is conveniently wound upon a spool 4, and upon the leading end of the string there is located a series of buttons 5, in this instance rectangular or cubical. The buttons may be of the same color as the string, but are preferably of some different color.

In Fig. 2 the same square board 6 is employed, and two of its opposite edges are provided with kerfs 7, located opposite each other. 8 designates the spool, and 9 the string, while 10 represents the buttons, which in this instance are circular. As in the previous instance, the string, buttons, and board may be of different colors, if desired.

In Fig. 3 the board 11 is made oblong, and its two narrowest edges are provided with opposite kerfs 12. In this instance 13 designates the string and 14 the buttons.

A detail view of the buttons is shown in Fig. 5 and designated as 5. Each button is provided near its rear face with a bore 15, whereby it may be strung upon the string.

In Fig. 1 I have shown a board best adapted for the use intended, in that by forming kerfs upon all of the edges greater varieties of designs may be secured, the string being in some instances passed diagonally at different angles, whereas in Figs. 2 and 3 the strings are all parallel and cross the face of the board.

Ordinarily the same number of buttons are placed on each of the cord-lines—that is, upon those portions of the cord or string that lie between two connected kerfs. The strings and buttons may remain permanently upon the board or can be removed at pleasure, to be replaced by other shapes and colors of buttons and strings. The inner faces of the buttons are preferably flat, in order that they may lie flatly against the surface of the board, and the bores through the buttons are such as will permit them to be readily slid upon the cord or string. Before beginning the work the buttons of each string are divided, one part of them being pushed to one side of the board and the other part being pushed to the opposite side, leaving an open intermediate space. In this space the main design is formed by means of the buttons, which are slid along the cord from the opposite sides toward the center. After the completion of the central design those buttons that may be left on either side of the design may be worked into smaller designs, as shown best in Fig. 3 of the drawings. The number of buttons to be used depends upon the size of the board, the number of kerfs, and the design to be made. When the board is to be used for "number-work" only, every alternate row of buttons is moved to the right of the board and the others to the left, as in Fig. 2. The buttons may then be arranged to form as many combinations and numbers at one time as there are rows of buttons. When the buttons are round, they may be placed close together in groups and the groups a little distance apart; but when they are circular or polygonal they may be grouped about one-twelfth of an inch from each other.

The following operation takes place in applying the string or cord and buttons to the board. The cord is wound upon a small spool, as shown, the buttons being strung upon the leading end thereof. A portion of the cord containing a number of buttons is drawn across the board at a place where the design is to begin. This leading end of the cord is tied to the board and beyond the same is stretched across to the opposite kerf or any kerf desired, leaving a certain number of buttons between the two kerfs. The cord is then carried on to the next kerf, a suitable number of buttons run down upon the same, and is then carried over and introduced into a third kerf, and so on, the cord being laced back and forth in the various kerfs. When the work is completed, the spool, together with the remaining buttons, if there be any, may be conveniently tucked into a portion of the cord that lies in rear of the board.

Having described my invention, what I claim is—

1. The herein-described educational appliance, comprising a board provided with notches in its edges, in combination with a cord having buttons loosely strung thereon and adapted to engage said notches, substantially as specified.

2. The herein-described educational appliance, the same consisting of a rectangular board, the four edges of which are provided with odd numbers of notches or kerfs, combined with a cord for removably engaging the notches and a series of buttons loosely strung upon the cord, substantially as specified.

JUDITH L. COLLINS.

Witnesses:
JOHN A. FORD,
R. F. COOPER.